(12) United States Patent
Prabhu et al.

(10) Patent No.: US 8,712,560 B2
(45) Date of Patent: Apr. 29, 2014

(54) PERFORMANCE MONITORING OF ADVANCED PROCESS CONTROL SYSTEMS

(75) Inventors: Amogh Vishwanath Prabhu, Newark, DE (US); Geraldine Carlos, Neuilly sur Seine (FR)

(73) Assignee: L'Air Liquide Societe Anonyme pour l'Etude et l'Exploration des Procedes Georges Claude, Paris (FR)

( * ) Notice: Subject to any disclaimer, the term of this patent is extended or adjusted under 35 U.S.C. 154(b) by 282 days.

(21) Appl. No.: 12/967,742

(22) Filed: Dec. 14, 2010

(65) Prior Publication Data

US 2012/0150335 A1    Jun. 14, 2012

Related U.S. Application Data

(60) Provisional application No. 61/421,034, filed on Dec. 8, 2010.

(51) Int. Cl.
*G05B 21/02* (2006.01)
(52) U.S. Cl.
USPC .......................................................... 700/79
(58) Field of Classification Search
USPC .......................................................... 700/110
See application file for complete search history.

(56) References Cited

U.S. PATENT DOCUMENTS

| | | | |
|---|---|---|---|
| 5,067,099 A | 11/1991 | McCown et al. | |
| 5,257,206 A | 10/1993 | Hanson | |
| 6,182,022 B1* | 1/2001 | Mayle et al. | 702/182 |
| 6,532,182 B2* | 3/2003 | Ogawa et al. | 365/201 |
| 6,666,049 B1 | 12/2003 | Katende et al. | |
| 6,675,128 B1* | 1/2004 | Hellerstein | 702/182 |
| 6,993,403 B1 | 1/2006 | Dadebo et al. | |
| 7,076,695 B2* | 7/2006 | McGee et al. | 714/47.2 |
| 7,444,263 B2* | 10/2008 | White et al. | 702/180 |
| 7,900,201 B1* | 3/2011 | Qureshi et al. | 717/174 |
| 2011/0161048 A1* | 6/2011 | Sodem et al. | 702/181 |
| 2011/0187488 A1* | 8/2011 | Fiske et al. | 340/3.1 |
| 2012/0078894 A1* | 3/2012 | Jiang et al. | 707/723 |

* cited by examiner

*Primary Examiner* — Kavita Padmanabhan
*Assistant Examiner* — Patrick Cummins
(74) *Attorney, Agent, or Firm* — Elwood L. Haynes (57) ABSTRACT

Techniques are described for monitoring the performance of advanced process control (APC) systems used to control complex industrial processes. By correlating an alarm status of the APC system with an alarm status associated with the service factor (or service factor thresholds), a plant operator can understand how well the APC system performs over time, as well as identify when operator intervention may be required (or alternatively, may be the source of poor plant performance). Accordingly, embodiments of the invention can significantly impact both the reliability and efficiency of complex industrial process, e.g., the production of industrial gases using air separation units (ASUs) and steam methane reformer (SMR) furnaces.

19 Claims, 5 Drawing Sheets

| 520 SERVICE FACTOR IN ALARM AND APC SYSTEM NOT IN ALARM $(A_{SF} = 1)$ AND $(A_{APC} = 0)$ RECOMMENDATION: PASSIVE MONITORING | 505 SERVICE FACTOR NOT IN ALARM AND APC SYSTEM NOT IN ALARM $(A_{SF} = 0)$ AND $(A_{APC} = 0)$ RECOMMENDATION: PASSIVE MONITORING |
|---|---|
| 515 SERVICE FACTOR IN ALARM AND APC SYSTEM IN ALARM $(A_{SF} = 1)$ AND $(A_{APC} = 1)$ RECOMMENDATION: REACTIVE MONITORING INTERVENTION REQUIRED | 510 SERVICE FACTOR NOT IN ALARM AND APC SYSTEM IN ALARM $(A_{SF} = 0)$ AND $(A_{APC} = 1)$ RECOMMENDATION: PROACTIVE MONITORING INTERVENTION NEEDED TO LOWER SERVICE FACTOR |

FIG. 5

PERFORMANCE MONITORING OF ADVANCED PROCESS CONTROL SYSTEMS

CROSS-REFERENCE TO RELATED APPLICATIONS

This application claims the benefit of U.S. Provisional Application No. 61/421,034, filed Dec. 8, 2010, the entire contents of which are incorporated herein by reference.

BACKGROUND

A producer/distributor of purified gases, such as oxygen gas ($O_2$) and nitrogen ($N_2$) gas, continuously strives to increase the stability, quality, reliability, safety, and cost-effectiveness of its process plants. At such plants, air separation units (ASUs) are used to distill gases from atmosphere. Similarly, a producer may use a steam methane reforming (SMR) furnace to produce hydrogen gas ($H_2$) from a hydrocarbon feed source. The resulting industrial gases are typically stored in tanks at the production facility or transported in trucks or over a pipeline to a storage facility or to customers for use in other industrial operations.

Running and maintaining this sort of large industrial system is a complicated and expensive process. As a result, sophisticated monitoring and process control systems are available which allow the producer to monitor and control a production facility. For example, software applications are available that monitor the operational state of ASUs, steam hydrocarbon reformers, pipeline components, including compressors pumps, valves, segments, product purity (e.g., hydrogen, nitrogen, oxygen purity) flow rates, energy consumption rates, reaction/product temperatures and pressures, etc.

Sensors affixed to an ASU, SMR, or other components of the production/distribution facility are configured to relay information regarding a then current state of the device to an operations control center, where they are stored in a database. In some cases, the monitoring systems may be configured to raise an alarm when a monitored parameter (or combination of parameters) falls below (or climbs above) a predetermined value. In addition to monitoring, advanced process control systems may be configured to control the operational state of the production facility. For example, a feedback loop may be used to adjust the burners within an SMR furnace in order to maintain a desired reaction temperature. Additionally, multiple APC systems may operate in tandem with one another to control the operating conditions within a production facility.

Other complex industrial systems and processes use a similar approach. For example, a petroleum refinery (at one end of a pipeline) may be monitored from a central control center configured to receive data collected from the field devices of the refinery.

SUMMARY

One embodiment of the invention provides a computer-implemented method for monitoring the performance of an advanced process control (APC) system having a plurality of system variables used to control an industrial process. The method of the present invention comprises determining a count of performance metrics associated with the industrial process in an alarm state, determining, based on the count, whether the APC system is in an alarm state, determining a service factor for the APC system, and correlating the alarm state of the APC system and the service factor alarm state in order to generate a recommendation for controlling the industrial process using the APC system. Another embodiment of the present invention provides a computer-readable storage medium containing program which when executed on a processor, performs an operation for monitoring the performance of an APC system having a plurality of systems variables used to control an industrial process. A still further embodiment involves a system that comprises a processor and a memory storing a monitoring application which when executed on a processor, performs an operation for monitoring the performance of an APC system having a plurality of systems variables used to control an industrial process.

BRIEF DESCRIPTION OF THE FIGURES

For a further understanding of the nature and objects of the present invention, reference should be made to the following detailed description, taken in conjunction with the accompanying figures, in which like elements are given the same or analogous reference numbers.

DESCRIPTION OF PREFERRED EMBODIMENTS

Embodiments of the invention provide techniques for monitoring the performance of advanced process control (APC) systems used to control complex industrial processes. For example, embodiments of the invention provide a method to identify problems with an APC system by evaluating a variety of operational metrics associated with the industrial process, as well as determine a correlation between a service factor and the performance of the APC system. The APC system aims to maintain certain operational variables associated with the industrial process in a desired range (e.g., product purity). Such variables may be referred to as "controlled variables" (or CVs). To keep the CVs in a desired range, the APC system (or plant operator) manipulates the values of other variables that are known to affect the CVs (e.g., product flow). These control handles may be referred to as manipulated variables (or MVs). Finally, the "service factor" may be defined as a ratio of the number of MVs in use to the number of MVs available to be used. Thus, the higher the service factor, the more APC systems then currently in operation and a service factor of 1 would mean that all available APC systems were in use.

More generally, a high service factor indicates that a plant operator has decided to make maximum use of the capability of the APC systems to manage plant operations. If the performance metrics of a plant indicate good performance during a period with a high service factor, this means the APC systems are doing a good job of managing the operational state of the plant. Conversely, a high service factor with low operating performance indicates that the APC systems are doing a poor job of managing the operational state of the plant. Similarly, should a plant operator eschew using the available APC systems, resulting in a low service factor, then the performance of the plant, as gauged by the performance metrics, may depend more on the skill of a given plant operator.

In one embodiment, a monitoring system is configured to identify performance issues with the APC systems installed in ASU and SMR production facilities using a variety of different operational and/or performance metrics with alarm thresholds for each. For example, the metrics may correspond to product purities, flow rates, reaction temperatures, power consumption, raw material use, etc. The performance metrics of the APC are monitored and deviations that exceed a user-configurable threshold are flagged. That is, when a metric is sufficiently outside of a specified operational range (e.g., the metric is within a $90^{th}$ percentile distribution of observed operating conditions), that metric is said to be in alarm. When a user-configurable number of APC metrics are in alarm, the APC system itself is said to be in alarm. By correlating an alarm status of the APC system with an alarm status associated with the service factor (or service factor thresholds), a plant operator can understand how well the APC system performs over time, as well as identify when operator intervention may be required (or alternatively, may be the source of poor plant performance). Accordingly, embodiments of the invention can significantly impact both the reliability and efficiency of complex industrial process (e.g., the projection of industrial gases using ASUs and SMR furnaces).

Note, while embodiments of the invention are described relative to an application configured to monitor an APC system itself used to control ASUs at an industrial gas production facility, one of ordinary skill in the art will recognize that the APC performance monitoring tool disclosed herein may be adapted for a variety of purposes, as well as for pipeline components (e.g., pumps used to maintain a liquid pressure within a pipeline) and for other complex industrial applications. More generally, the performance of a broad variety of APC systems used to control complex industrial process equipment may be monitored using the APC performance monitoring tool disclosed herein.

One embodiment of the invention may be implemented as one or more software programs for use with a computer system. The program(s) include instructions for performing embodiments of the invention (including the methods described herein) and may be stored on a variety of computer-readable media. Illustrative computer-readable media include, but are not limited to: (i) non-writable storage media on which information is permanently stored (e.g., read-only memory devices within a computer such as CD-ROM or DVD-ROM disks readable by a CD-ROM or DVD-ROM drive) and/or (ii) writable storage media on which alterable information is stored (e.g., floppy disks within a diskette drive, hard-disk drives, or flash memory devices). Other media include communications media through which information is conveyed to a computer, such as a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

Further, the description herein references embodiments of the invention. However, it should be understood that the invention is not limited to any specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In general, the routines executed to implement the embodiments of the invention, may be part of an operating system or a specific application, component, program, module, object, or sequence of instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
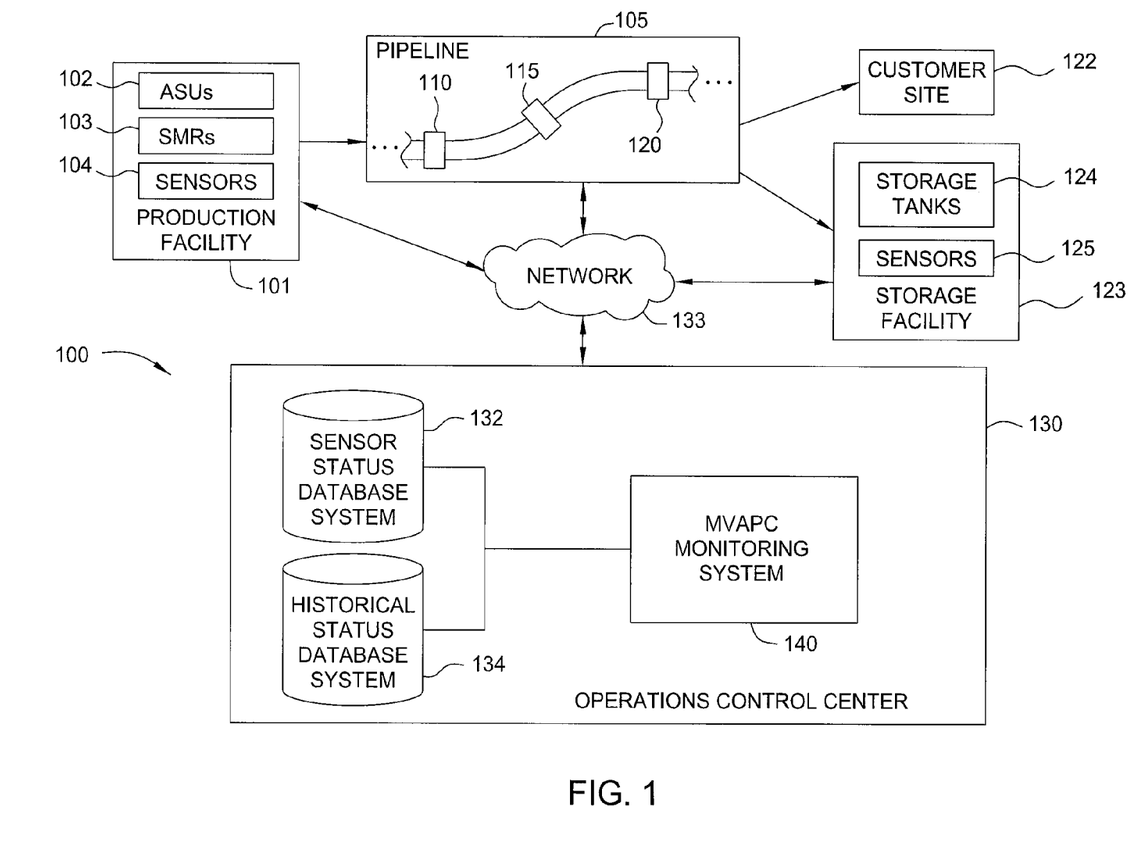
FIG. 1 is a conceptual illustration of an industrial production and distribution system managed at an operations control center, according to one embodiment of the invention.

FIG. 1 is a conceptual illustration of an industrial production and distribution system managed 100 at an operations control center 130, according to one embodiment of the invention. As shown, a production facility 101 includes one or more air separation units (ASUs) 102, steam methane reformers (SMRs) 103, and sensors 104. The sensors 104 may be configured to monitor a variety of aspects of the ASUs 102 and SMRs 103. For example, input/output product purity, product composition, flow rates, temperatures and pressures, compressor motor temperatures, energy consumption, column liquid levels, catalyst depletion, furnace temperatures, and gas composition to name a few examples.

In this example, product generated by the ASUs 102 and/or SMRs 103 may be transported over pipeline network 105. The pipeline network 105 includes three compressor stations 110, 115, and 120. Each of the compressor stations 110, 115, and 120 may include one or more compressors used to maintain the gas pressure present in pipeline 105. Additionally, compressor stations 110, 115, and 120 may include sensor equipment used to monitor aspects of the operational state of pipeline 105. For a pressurized gas pipeline, a wide variety of compressor parameters may be monitored including, for example, inlet gas pressure, outlet gas pressure, gas temperature, flow rates, and power consumption, among others. Of course, for other applications of the invention, the sensors or monitoring equipment may be selected to suit the needs of a particular case. The monitoring may be dynamic (i.e., "real-time"), or periodic where an operational parameter of the pipeline is sampled (or polled) at periodic intervals. From the pipeline 105, product may be delivered to customer sites 122 or stored in storage tanks 124 at a storage facility 123. Like the sensors 104 monitoring the production facility, sensors 125 may monitor conditions at the storage facility 123 (e.g., to monitor tank storage levels, temperatures, etc.).

In one embodiment, data obtained by the sensors 104, 125 is transmitted to pipeline operations control center 130 over a network 133. In turn, the operations control center 130 may employ a number of computer systems running application programs used to coordinate, monitor, and control the operations of pipeline 105. Illustratively, the operations control center 130 includes a sensor status database system 132, a historical status database system 134, and an APC performance monitoring system 140. The computer systems 132, 134, and 140 illustrated in operations control center 130 are included to be representative of existing computer systems, e.g., desktop computers, server computers, laptop computers, tablet computers and the like. However, embodiments of the invention are not limited to any particular computing system, application, device, architecture or network, and instead, may be adapted to take advantage of new computing systems and platforms as they become available. Additionally, one skilled in the art will recognize that the illustrations of production facility 101, pipeline 105, storage facility, and the computer systems 132, 134, and 140 are simplified to highlight aspects of the present invention and that computing systems and networks typically include a variety of components not shown in FIG. 1.

The sensor status database 132 provides a computing system configured with a database application itself configured to receive and store performance metrics determined from the sensors 103 in the production facility 101 and the pipeline 105 and modified by 140. As new sensor data is received from the production facility 101 and the pipeline 105, data from the sensor status database 132 may be archived in the historical status database 134.

As described in greater detail below, in one embodiment, the APC monitoring system 140 may be configured to monitor the sensor values received from the production facility 101 and the pipeline 105 in order to monitor the performance of the production facility 101 over time. Further, the APC monitoring system may correlate the performance of the APC systems used by the production facility 101, pipeline 105, and storage facility 123, with a service factor indicating the fraction of the APC system capacity in use.

Figure 2:
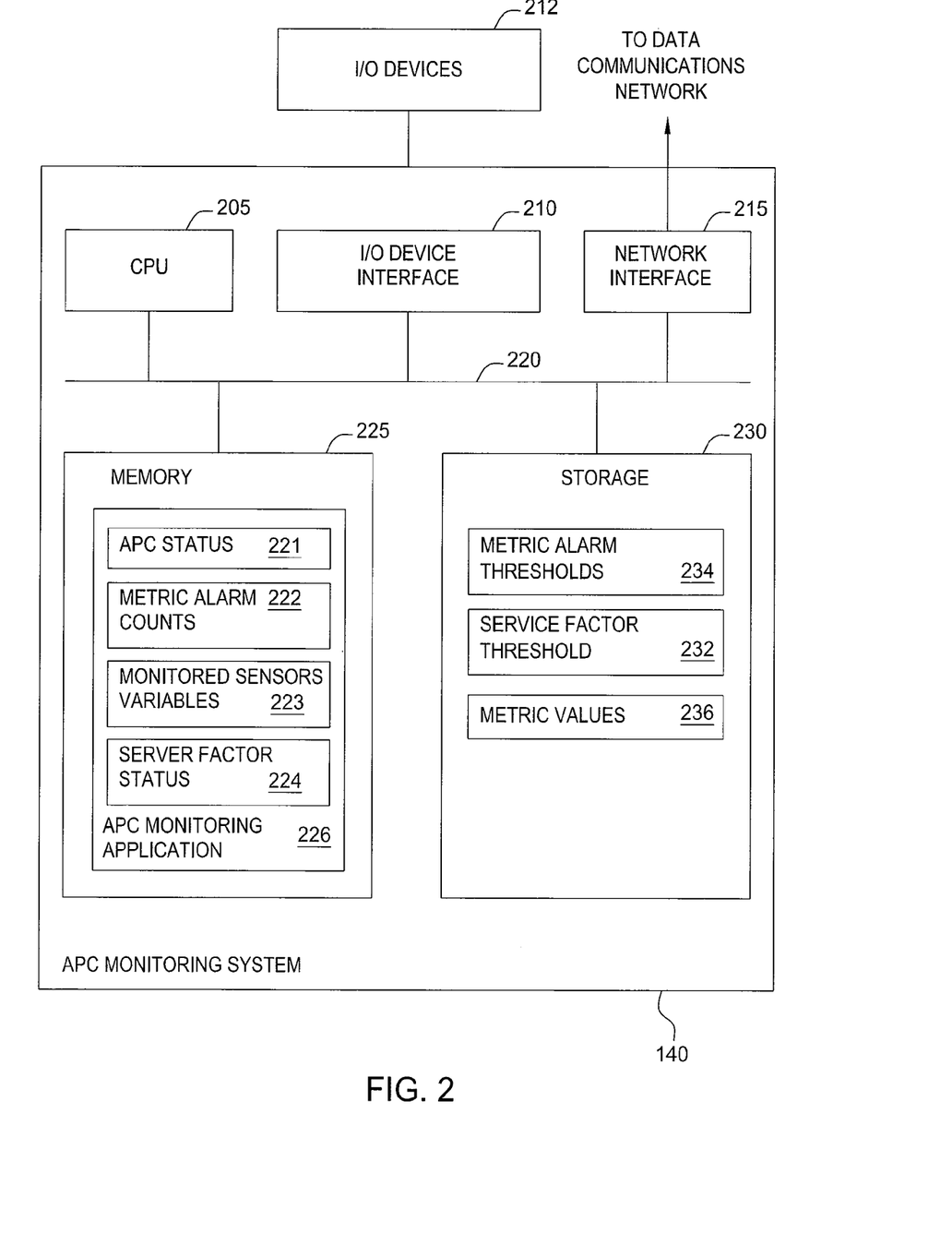
FIG. 2 illustrates a computing system used to monitor the performance of an APC system, according to one embodiment of the invention.

FIG. 2 further illustrates the computing system 140 first shown in FIG. 1, configured to monitor the performance of an advanced process control (APC) system, according to one embodiment of the invention. As shown, the server computing system 140 includes, without limitation, a central processing unit (CPU) 205, a network interface 215, an interconnect 220, a memory 225, and storage 230. The computing system may also include an I/O device interface 210 connecting I/O devices 212 to computing system 140 (e.g., keyboard, display and mouse devices).

The CPU 205 retrieves and executes programming instructions stored in the memory 225. Similarly, the CPU 205 stores and retrieves application data residing in the memory 225. The interconnect 220 facilitates transmission, such as of programming instructions and application data, between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. The storage 230 may be a disk drive storage device. Although shown as a single unit, the storage 230 may be a combination of fixed and/or removable storage devices, such as fixed disc drives, solid state devices (SSDs), floppy disc drives, tape drives, removable memory cards, or optical storage, network attached storage (NAS), or a storage area-network (SAN).

Illustratively, the memory 225 includes an APC monitoring application 226 and storage 230 includes metric alarm thresholds 234, service factor alarm thresholds 232, and metric values 236. Monitoring tool 226 provides a software application configured to monitor the performance of the APC systems at a specific industrial facility. For example, as noted above, the monitoring tool 226 may monitor the performance of APC systems themselves used to control the operations of a set of ASUs and/or SMRs used to produce industrial gasses. In such a case, the monitoring tool 226 may monitor metrics related to underlying product purity, product composition, energy and raw material consumptions, etc. For example, for product purity measures, the performance metric could include the purity of an industrial gas produced using an ASU, as well as mean and a variance determined from changes in product purity produced using the ASU over a specified time (i.e., for each of multiple calculation intervals). In such a case, the mean and the variance in product purity each provide an example of a performance metric determined from the underlying monitored sensor variable 223. The performance metrics observed during each given calculation interval may be stored as metric values 236.

In one embodiment, metric alarm thresholds 234 are used to specify when a given metric (e.g., the mean of product purity) is in alarm. In the case of a mean of product purity, the corresponding metric alarm threshold 234 could be set to be a product purity that falls within a $90^{th}$ percentile distribution of observed operating conditions, i.e., well outside of the typically observed conditions. Of course, other threshold percentiles could be used. Further, one of ordinary skill in the art will recognize that in addition to the mean and variance, a variety of other statistical measures could be used as a performance metric related to the performance of an APC system, and such metrics may be selected to suit the needs of a particular case.

As shown, the APC monitoring application 226 includes APC status 221, metric alarm counts 222, monitored sensor variables 223, and service factor status 224. The APC status 221 is used to indicate whether the APC systems monitored by application 226 are in alarm. In one embodiment, the APC system is considered to be "in alarm" whenever a user-configurable number of the underlying performance metrics are themselves considered to be in alarm. Accordingly, the metric alarm counts 222 indicate how may of the monitored performance metrics are in an alarm state at any given time. The monitored sensor variables 223 correspond to the raw data used to determine the value for a given performance metric. That is, the value of a performance metric may be obtained using the sensor data monitoring the then existing conditions at the production plant—shown in FIG. 2 as monitored sensor variables 223.

As noted above, the "service factor" may be defined as a ratio of the number of variables currently being manipulated to control the monitored sensor variables 223 to the total number of variables available to be manipulated by the APC system. The service factor status 224 indicates whether the service factor is in an alarm state, or more simply in alarm. In one embodiment, the service factor is considered to be in alarm, whenever it falls below a user-configurable service factor threshold 232. For example, like the threshold related to the mean of product purity, the service factor threshold 232 may be defined relative to a mean (or variance) of the service factor observed over time. In such a case, e.g., a service factor that falls within a $90^{th}$ percentile distribution of observed service factors could be set as the threshold for setting the service factor status 224 to be in alarm.

Figure 3:
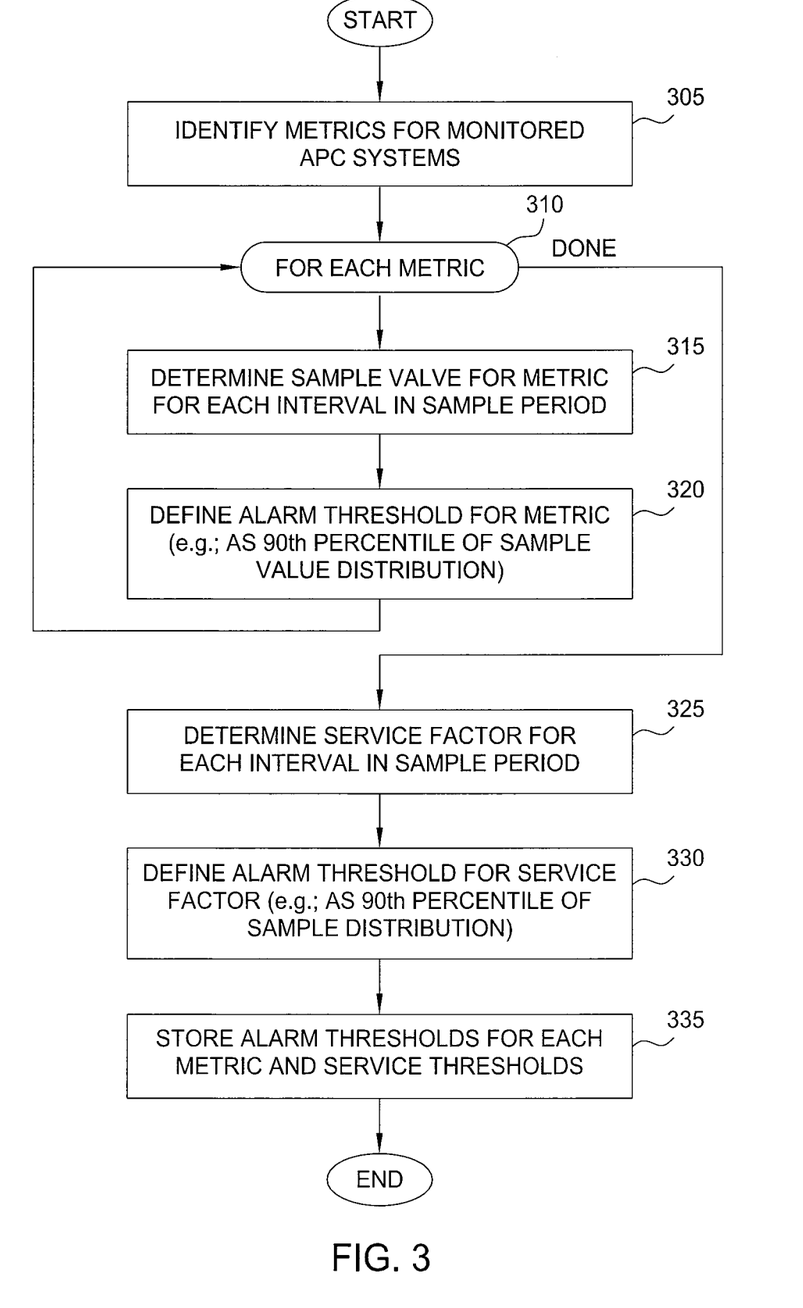
FIG. 3 illustrates a method to configure alarm thresholds for both a plurality of plant metrics monitored by an APC system and a service factor of the APC system, according to one embodiment of the invention.

An example embodiment for determining the metric alarm thresholds 234 and the service factor threshold 232 is shown in FIG. 3. More specifically, FIG. 3 illustrates a method 300 for configuring alarm thresholds for both a plurality of plant metrics monitored by an APC system and a service factor of the APC system, according to one embodiment of the invention.

As shown, the method 300 begins at step 305, where the APC monitoring application 226 identifies which performance metrics of the APC system are to be monitored. Again using an ASU as an example, the APC monitoring application 226 could identify the mean and variance of product purity for each industrial gas generated by the ASU (e.g., $N_2$ and $O_2$) and energy consumption rates as metrics to be monitored. At step 310, a loop begins, where the APC monitoring application 226 determines the appropriate alarm threshold for each performance metric identified at step 305. First, at step 315, the APC monitoring application 226 determines a sample value for the metric for each interval of a sampling period (e.g., the purity of oxygen gas produced by the ASU sampled every 30 minutes over a two-week period). After identifying the monitored sensor variable data for a given performance metric, the APC monitoring application 226 defines an alarm threshold for the metric (e.g., at the $90^{th}$ percentile of purity for oxygen gas determined from the samples values) in step 320. Determining an alarm threshold from recently observed plant performance allows the alarm threshold to "float" with gradual changes in plant performance.

Steps 315 and 320 are repeated to identify an "in alarm" threshold for each monitored performance metric. Once done, at step 325, the APC monitoring application 226 determines a then existing service factor for each interval in a sample period.

That is, the APC monitoring application 226 determines a ratio of the number of manipulated variables (to control monitored sensor variables 223) in use to the number of manipulated variables available to be used to control an industrial process. The sample period may correspond to the same time interval used to determine the thresholds for the performance metrics determined within the loop of step 310. Based on the service factor values, at step 330 the APC monitoring application 226 defines an alarm threshold for the service factor, e.g., at the $90^{th}$ percentile of the mean of the historical service factor values. At step 335, the APC monitoring application 226 stores the alarm threshold for each metric as well as the alarm threshold for the service factor value.

Figure 4:
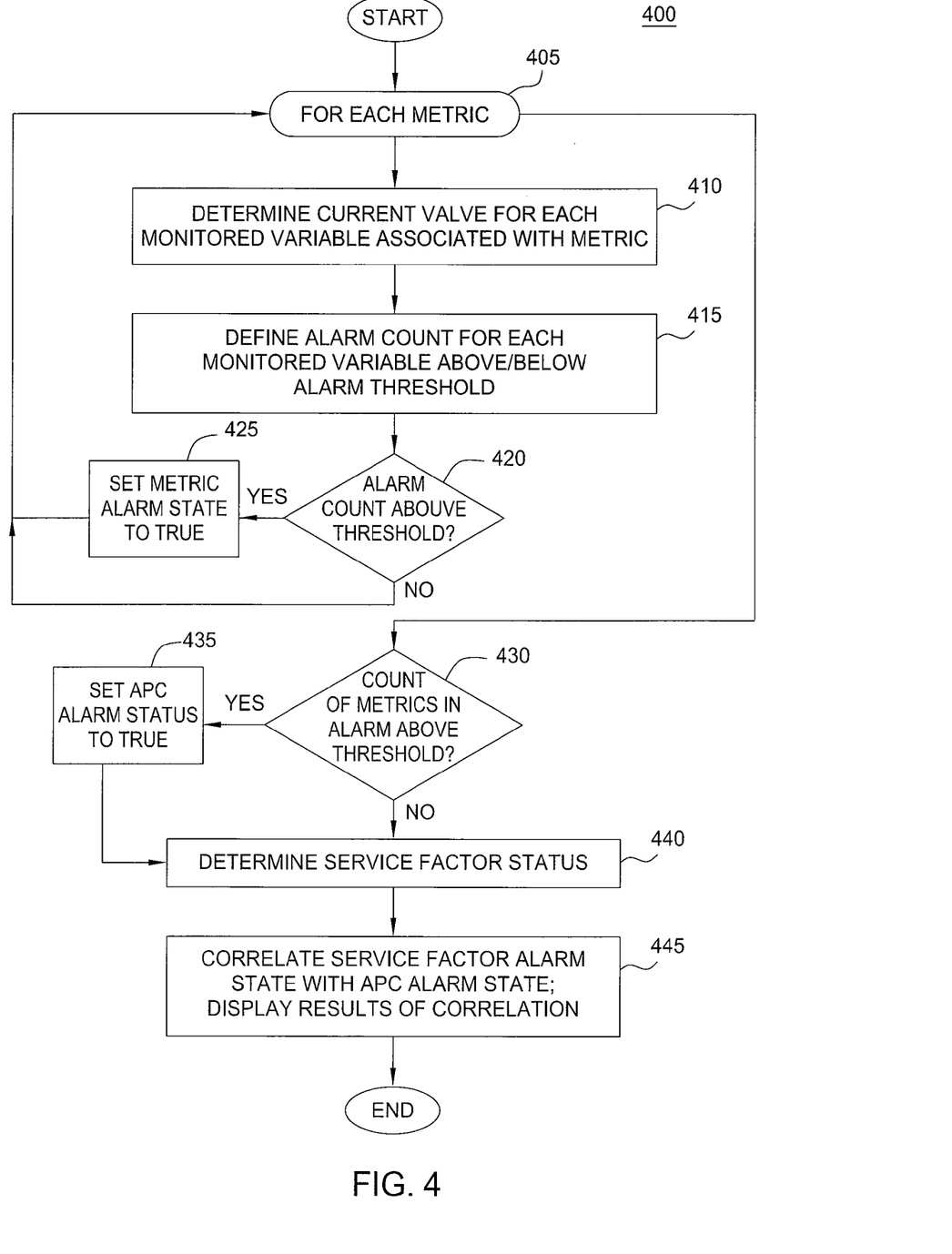
FIG. 4 illustrates a method for monitoring the performance of an APC system, according to one embodiment of the invention.

Once the alarm thresholds for the performance metrics and the service factor are determined, the APC monitoring application 226 can monitor the performance of the APC system, as well as correlate the alarm status of the APC system with an alarm status associated with the service factor. Doing so allows a plant operator to identity how well the APC systems deployed at an industrial facility are performing. For example, FIG. 4 illustrates a method 400 for monitoring the performance of an APC system, according to one embodiment of the invention.

As shown, the method 400 begins with a loop at step 405, where the APC monitoring application 226 evaluates a current status for each performance metric. Accordingly, at step 410, the APC monitoring application 226 determines a current value for each monitored value associated with a given performance metric. For example, the APC monitoring application 226 may determine the current purity of a plurality of industrial gases generated by an ASU. Further, the product purity may be sampled at different points within the production facility (e.g., at the ASU distillations column and at the inlets/outlets of the pipeline). Each sampled purity value is compared to the performance metric threshold for different metrics, e.g., the mean and the variance of product purity for each industrial gas. If the purity value for a given industrial gas exceeds the threshold for that industrial gas, then the metric is considered to be in alarm (relative to that gas product). Of course, for other plant sensor data, or other statistical measures, the appropriate raw sensor data will vary. At step 415, the APC monitoring application 226 determines an alarm count for each monitored value that is above (or in the appropriate case below) the alarm threshold. And at step 420, if the alarm count exceeds a user-configurable threshold, then the alarm state for the metric being considered through the current pass of the loop 405 is set to be in alarm in step 425. The method 400 then returns to step 405 to determine the alarm state for additional performance metrics associated with the APC system.

Once loop 405 is complete, i.e., once all the individual performance metrics have been evaluated to determine a then existing alarm state for each one, the APC monitoring application 226 determines whether the count of metrics in alarm exceeds a user-configurable threshold (step 430). If so, at step 435, an APC alarm state is set to true. That is, if a sufficient number of individual performance metrics are in alarm, the APC system as a whole is set to an alarm state.

Following step 430 (or 435), the APC monitoring application 226 determines a service factor alarm status. That is, the APC monitoring application 226 determines whether the service factor has fallen below a threshold determined relative to a statistical distribution of observed service factor values in step 440. Of course, as an alternative, the service factor alarm threshold may be specified as a fixed, user-configurable value or relative to a specified magnitude change to the service factor. At step 445, the APC monitoring application 226 correlates the service factor alarm state with the APC alarm state and displays the results on graphical interface. That is, the APC monitoring application 226 compares the APC alarm state with the APC alarm state to determine whether operator intervention is needed (or possibly hindering plant performance).

Figure 5:
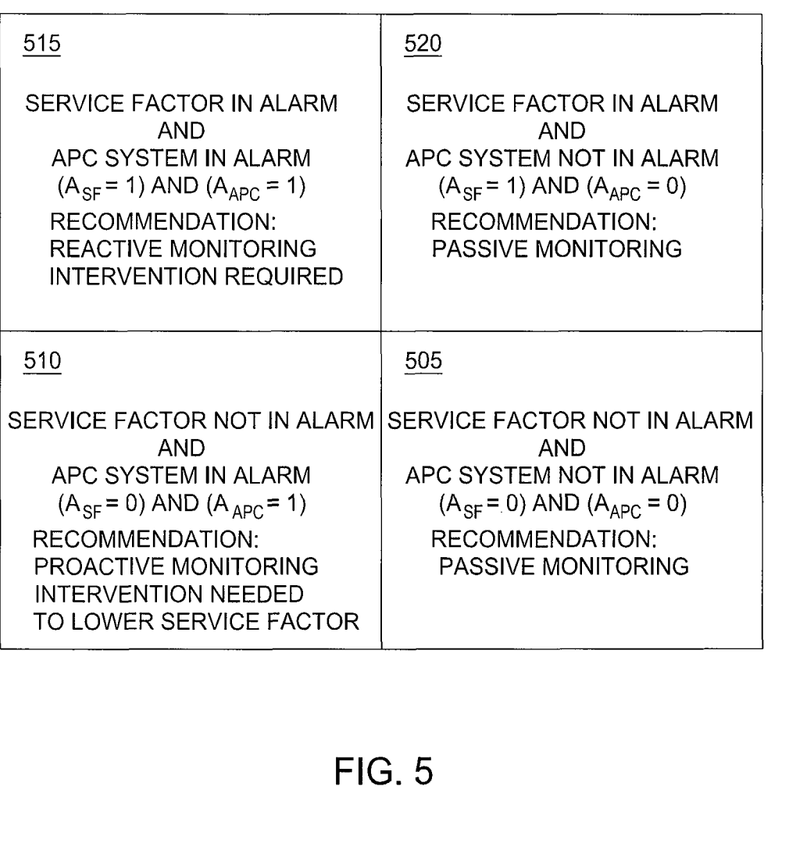
FIG. 5 is a table illustrating an alarm state determined while monitoring the performance of an APC system based on a number of metrics in alarm and a service factor alarm, according to one embodiment of the invention.

For example, FIG. 5 shows the four possible correlated alarm states for the APC alarm state and the service factor alarm state. More specifically, FIG. 5 is a table illustrating an alarm state determined while monitoring the performance of an APC system based on a number of metrics in alarm and a service factor alarm, according to one embodiment of the invention.

As shown in state 505, if neither the APC alarm state nor the service factor is in alarm, then the plant is performing well during a period with a high service factor. This means the APC system is doing a good job of managing the operational state of the plant. As a result, the interface of the APC monitoring application 226 recommends passive monitoring and allowing the APC system to continue to manage the operational state of the plant. This is the preferred state, a high service factor where the APC systems are successfully managing plant operations.

Alternatively, in state 510 if the service factor is not in alarm while the APC alarm state is in alarm, then this indicates that the APC systems are doing a poor job of managing the operational state of the plant and that the plant operator should intervene to improve the situation. Accordingly, state 510 includes a recommendation of proactive monitoring. That is, the plant operator should intervene to lower the service factor and take control of more of the plant system directly. Alternatively still, in state 515, if both the service factor and the APC alarm state are in alarm, then operator intervention is needed to restore the plant performance metrics to the operating ranges. Accordingly, state 515 includes a recommendation of reactive monitoring, where the plant operator should intervene to increase the service factor, allowing the APC systems to restore plant systems to desired operating ranges.

Lastly, in state 520, if the service factor is in alarm, but the APC alarm state is not, then the plant is operating well, despite the APC systems not being used. That is, the individual performance metrics indicate the plant is operating within desired ranges, despite the lowered service factor. In such a case, the APC monitoring application 226 recommends passive monitoring.

Advantageously, embodiments of the invention provide techniques for monitoring the performance of APC systems used to control complex industrial processes. By correlating an alarm status of the APC system with an alarm status associated with the service factor (or service factor thresholds), a plant operator can understand how well the APC system performs over time, as well as identify when operator intervention may be required (or alternatively, may be the source of poor plant performance). Accordingly, embodiments of the invention can significantly impact both the reliability and efficiency of complex industrial process (e.g., the projection of industrial gases using ASUs and SMR furnaces).

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A computer-implemented method for monitoring the performance of an advanced process control (APC) system having a plurality of system variables used to control an industrial process, the method comprising:
   determining a count of performance metrics associated with the industrial process in an alarm state;
   determining, based on the count, whether the APC system is in an alarm state;
   determining a service factor for the APC system, wherein the service factor is determined as a ratio of a number of the system variables then currently being manipulated to control the performance metrics to a total number of the system variables of the industrial process available to be manipulated; and
   correlating the alarm state of the APC system and an alarm state of the service factor in order to generate a recommendation for controlling the industrial process using the APC system.

2. The computer-implemented method of claim 1, wherein the service factor has an associated threshold for determining whether the service factor is in an alarm state.

3. The computer-implemented method of claim 2, wherein the threshold is determined relative to a collection of historical values of the service factor.

4. The computer-implemented method of claim 1, wherein at least a first performance metric has an associated threshold for determining whether the first performance metric in an alarm state.

5. The computer-implemented method of claim 4, wherein the threshold is determined relative to a collection of historical values of the performance metric.

6. The computer-implemented method of claim 1, wherein correlating the alarm state of the APC system and the service factor alarm state comprises, determining that the APC system is in an alarm state and that service factor is not in an alarm state, and wherein the generated recommendation is to lower the service factor.

7. The computer-implemented method of claim 1, wherein correlating the alarm state of the APC system and the service factor alarm state comprises, determining that the APC system is not in an alarm state and that service factor is in an alarm state.

8. The computer-implemented method of claim 1, wherein correlating the alarm state of the APC system and the service factor alarm state comprises, determining that neither the APC system nor the service factor is in an alarm state.

9. The computer-implemented method of claim 1, wherein correlating the alarm state of the APC system and the service factor alarm state comprises, determining that both the APC system and the service factor are in an alarm state, and wherein the generated recommendation is for operator intervention to restore the performance metrics to a desired set of operating ranges.

10. A non-transitory computer-readable storage medium containing a program, which, when executed on a processor, performs an operation for monitoring the performance of an advanced process control (APC) system having a plurality of system variables used to control an industrial process, the operation comprising:
    determining a count of performance metrics associated with the industrial process in an alarm state;
    determining, based on the count, whether the APC system is in an alarm state; determining a service factor for the APC system, wherein the service factor is determined as a ratio of a number of the system variables then currently being manipulated to control the performance metrics to a total number of the system variables of the industrial process available to be manipulated; and
    correlating the alarm state of the APC system and an alarm state of the service factor in order to generate a recommendation for controlling the industrial process using the APC system.

11. The computer-readable storage medium of claim 10, wherein the service factor has an associated threshold for determining whether the service factor is in an alarm state.

12. The computer-readable storage medium of claim 11, wherein the threshold is determined relative to a collection of historical values of the service factor.

13. The computer-readable storage medium of claim 10, wherein at least a first performance metric has an associated threshold for determining whether the first performance metric in an alarm state.

14. The computer-readable storage medium of claim 13, wherein the threshold is determined relative to a collection of historical values of the performance metric.

15. A system, comprising: a processor; and a memory storing a monitoring application, which, when executed by the processor, performs an operation for monitoring the performance of an advanced process control (APC) system having a plurality of system variables used to control an industrial process, the operation comprising:
    determining a count of performance metrics associated with the industrial process in an alarm state,
    determining, based on the count, whether the APC system is in an alarm state,
    determining a service factor for the APC system, wherein the service factor is determined as a ratio of a number of the system variables then currently being manipulated to control the performance metrics to a total number of the system variables of the industrial process available to be manipulated, and correlating the alarm state of the APC system and an alarm state of the service factor in order to generate a recommendation for controlling the industrial process using the APC system.

16. The system of claim 15, wherein the service factor has an associated threshold for determining whether the service factor is in an alarm state.

17. The system of claim 16, wherein the threshold is determined relative to a collection of historical values of the service factor.

18. The system of claim 15, wherein at least a first performance metric has an associated threshold for determining whether the first performance metric in an alarm state.

19. The system of claim 18, wherein the threshold is determined relative to a collection of historical values of the performance metric.

* * * * *